US008915291B2

(12) United States Patent
Farina

(10) Patent No.: US 8,915,291 B2
(45) Date of Patent: Dec. 23, 2014

(54) PLANT FOR THE CONTINUOUS FORMATION OF GRIDS FOR ELECTRIC BATTERY PLATES

(71) Applicant: Sovema S.P.A, VR (IT)

(72) Inventor: Pietro Farina, VR (IT)

(73) Assignee: Sovema S.p.A., Vellafranca (IT)

( * ) Notice: Subject to any disclaimer, the term of this patent is extended or adjusted under 35 U.S.C. 154(b) by 89 days.

(21) Appl. No.: 13/897,412

(22) Filed: May 19, 2013

(65) Prior Publication Data

US 2014/0338855 A1  Nov. 20, 2014

(51) Int. Cl.
*B22D 25/04* (2006.01)
*B22D 11/06* (2006.01)
*B22D 11/114* (2006.01)

(52) U.S. Cl.
CPC ............ *B22D 25/04* (2013.01); *B22D 11/0611* (2013.01); *B22D 11/114* (2013.01)
USPC ........... 164/416; 164/427; 164/428; 164/429; 164/478; 164/479; 164/480

(58) Field of Classification Search
CPC ....... B22D 25/04; B22D 11/114; B22D 11/06

USPC .......................... 164/416, 427–434, 478–482
See application file for complete search history.

(56) References Cited

U.S. PATENT DOCUMENTS

| 4,544,014 A | 10/1985 | McLane et al. | |
| 8,322,399 B2* | 12/2012 | Farina | 164/459 |
| 2011/0030914 A1* | 2/2011 | Farina | 164/505 |

\* cited by examiner

*Primary Examiner* — Kevin E Yoon
(74) *Attorney, Agent, or Firm* — Mark M. Friedman

(57) ABSTRACT

Plant for forming grids for electric battery plates, which comprises a grid forming machine with continuous casting provided with a rotary drum, and a sliding block mounted fixed and slideably sealingly coupled with the external surface of the rotary drum and provided with means for distributing molten lead, in order to insert the molten lead within grooves provided on the external peripheral surface of the rotary drum during the rotation of the latter. The plant is also provided with an ultrasound generator placed to intercept a feed duct for the molten lead, connected to the distribution means and provided with at least one tip immersed in the pressurized flow of molten lead that moves through the aforesaid feed duct in order to transmit the waves produced by the ultrasound generator to the molten lead flow.

12 Claims, 4 Drawing Sheets

PLANT FOR THE CONTINUOUS FORMATION OF GRIDS FOR ELECTRIC BATTERY PLATES

FIELD OF APPLICATION

The present invention regards a plant for the continuous formation of grids for electric battery plates.

The present plant is intended to be employed in the electric battery production processes for the production of a continuous strip of lead grids, which is then cut into sections for the formation of the single grids intended to be employed with positive or negative polarity in batteries. The grids function both as electrical conductor and as mechanical support of the active material necessary for the electrochemical reactions. They are inserted with the two different polarities in the box-like body of the batteries in an electrolytic solution bath for the attainment of the redox reactions necessary for producing electrical energy.

STATE OF THE ART

The industrial production of lead grids, as is well known, must reconcile the requirements of high productivity and high mechanical and chemical performances. In particular, the grids must have high mechanical performances for supporting the active material without stretching or more generally without deformations during the various use conditions. In addition, the grids must have chemical performances that prevent the onset of corrosion phenomena that would limit the lifetime thereof, especially in the case of grids for positive polarity.

Grids provided with uniform crystalline microstructure and with fine grain obtained in the solidification of the lead cause an increase of the mechanical properties and an increased resistance to corrosion. Usually, a crystalline structure of globular type is deemed optimal for lead, substantially lacking dendritic formations and with grains uniformly distributed and with average size less than 50 µm.

As is known, the size of the grains that are formed starting from a crucible of molten lead is inversely proportional to the number of nuclei present in the liquid lead during solidification. The greater the number of active nuclei, the greater the number of crystallization grains and hence the smaller the final size of the latter. In order to increase the number of nuclei present in the molten lead bath, for the purpose of increasing the mechanical and chemical performances of the grids, it is possible to employ methods for refining the grains, such as quick cooling below the liquidus temperature, or the addition of refining agents. The first intervention type provides for a sudden cooling of the molten lead, with a consequent reduction of the space between the dendritic ramifications of the grains that are formed during solidification, and with a consequent marked increase of the mechanical properties of the grid.

By means of the chemical refining, already solid particles of other elements are instead added to the lead, termed inoculating or refining agents (such as copper, selenium and tin), which act as active nuclei in the liquid metal. In this case, the reduced size of the grains is ensured by a high number of heterogeneous nuclei suitably inserted in the molten lead bath.

For example, known from the U.S. Pat. No. 4,544,014 is the continuous production of lead grids by means of the use of a plant for the continuous formation of grids for electric battery plates, comprising a machine for continuous casting of a molten lead alloy on a rotary drum; such drum has, on the external peripheral surface thereof, a plurality of grooves distributed according to the design of the battery grid that one wishes to obtain. More in detail, the molten lead alloy is distributed in the grooves of the drum by means of an opening obtained on a sliding block mounted fixed on the machine and sealingly tightened against the surface of the drum parallel to the rotation axis of the latter. The sliding block has a smooth curved surface with shape corresponding to that of the external peripheral surface of the drum for a perfect adherence. The opening is attained on a distribution duct obtained longitudinally on the sliding block and continuously fed at overpressure with the molten lead that is drawn by means of a pump from a crucible. The molten lead is then distributed within the grooves from the opening while the sliding block achieves a scraping on the drum parts circumscribed by the grooves. The excess molten lead returns into the crucible through an outlet opening of the distribution duct.

The sliding block is heated by means of heating elements in order to allow the lead to remain in the liquid state and completely reach all the variously-oriented grooves that faun the design of the grid, as well as the grooves that form the enlarged edge of the grid.

The drum is instead maintained at controlled temperature, for example by means of puffs of air in order to allow the solidification of the lead filaments within the grooves.

The solidified continuous strip of grid is separated from the drum and sent to further processing steps such as rolling and cutting for the separation of the strip into single grids.

Such plant for the continuous production of lead grids allows reaching considerable production speeds, considerably improving the productivity of the non-continuous grid molding plants.

The main drawback of this plant lies in the fact that it does not allow obtaining, during the solidification of the lead alloy, the formation of grains distributed in a uniform manner and above all without the presence of dendritic formations.

In particular, on the surface of the drum, crystalline structures are formed termed "equiaxial" in technical jargon, all parallel, which are easily attacked by corrosion.

Also the use of chemical refining agents in the lead alloy crucible does not in this case produce the formation of uniformly distributed globular crystalline structures, due to the high speed of obtainment of the grids that does not allow the refining agents to act effectively.

Therefore, this plant type is well known in that it can continuously obtain lead grids with high productivity (e.g. around 40 m/min), good mechanical characteristics—given the possibility to obtain the threads distributed—but has the drawback that it does not allow a high quality of the crystalline structure, with the consequence that the finished grids are easily subjected to attack by corrosion.

Also known from the patent DE 3247201 is a plant for the continuous formation of grids for electric battery plates. In accordance with the first embodiment of FIGS. 1 and 2, the above provides for the use of an ultrasound generator having a tip immersed in the crucible of the lead alloy in molten state in order to transmit the waves produced by the ultrasound generator (12) thereto, before the alloy is sent to the mold. In accordance with a second and a third embodiment of the plant described in the patent DE 3247201 (respectively illustrated in FIGS. 3 and 4), the ultrasound generator is mechanically connected to the casting channel or to the mold (5) so as to vibrate them, transmitting the waves that it produces thereto, in order to transmit the waves by means of the casting channel/mold to the molten lead contained therein.

The plant described in this patent DE 3247201 does not allow the continuous forming of the lead grids and provides that the latter are formed by casting an amount of lead alloy in a mold and that, following the solidification of such lead alloy quantity, the grid thus formed is removed from the mold.

The arrangement of the ultrasound generator in the crucible, i.e. fixed to parts traversed by the lead in order to rotate them, has proven to be unsuitable for creating a high number of crystallizing nuclei.

In addition, the passage of the fluid from the crucible to the mold does not occur under pressure, and this further decreases the efficiency of the ultrasound generator.

In order to overcome these drawbacks, the patent application PD2009A000197 describes a plant for forming grids for electric battery plates, provided with a machine for continuous casting of a lead alloy, which comprises a rotary drum having an external peripheral surface with the grooves obtained according to the design of the grid to be obtained and a sliding block coupled in a sliding relationship with the external surface of the rotary drum and with a tank obtained for containing a molten lead bath. The tank is transversely extended for the entire width of the drum in order to uniformly feed the grooves.

An ultrasound generator is mounted on the tank, such generator provided with a tip (sonotrode) immersed in the bath of the tank in order to transmit the waves produced by the ultrasound generator to such bath.

The latter plant solution has shown in practice that it does not lack drawbacks. An important drawback lies consists of the fact that the ultrasound generator is associated with a specific middle area of the small tank, such that the nuclei—which due to such generator come to be formed in the molten lead—are not uniformly distributed along the transverse extension of the small tank. Consequently, only some filaments of the grids will have an optimal crystallization.

PRESENTATION OF THE INVENTION

In this situation, the problem underlying the present invention is therefore that of overcoming the drawbacks shown by the machines of known type by providing a plant for forming grids for electric battery plates, which allows obtaining grids formed with grains crystallized according to uniformly distributed formations and of globular type, and consequently provided with high mechanical and chemical performances.

A further object of the present finding is to obtain a plant that allows producing grids with high productivity.

A further object of the present finding is to obtain a plant that is structurally simple and entirely reliable in operation.

These objects and still others are all achieved by the plant for forming grids for electric battery plates that is the object of the present invention.

Due to this plant, it is possible to produce a continuous strip of lead grids, with a high production speed and with high mechanical and chemical performances, due in particular to an optimal distribution of the crystallizing nuclei in the molten lead.

The plant according to the invention is also simultaneously structurally simple and entirely reliable in operation.

BRIEF DESCRIPTION OF THE DRAWINGS

The technical characteristics of the finding, according to the aforesaid objects, can be clearly seen in the contents of the below-reported claims and the advantages thereof will be more evident in the following detailed description, made with reference to the enclosed drawings which represent a merely exemplifying and non-limiting embodiment of the finding, in which:

DETAILED DESCRIPTION OF A PREFERRED EMBODIMENT

With reference to the set of enclosed drawings, the reference number 100 indicates the plant for forming grids for electric battery plates, object of the present invention, in its entirety.

It is preferably operatively inserted in a line for the production of electric batteries that comprises a rolling station downstream for flattening the continuous strip of lead grids formed with the machine that is the object of the present invention, and a cutting station for dividing the continuous strip into sections corresponding with the single grids.

Hereinbelow, reference will be made, for the sake of descriptive simplicity, to a plant 100 adapted to treat a crucible of molten lead for the production of a corresponding lead grid; nevertheless, it is intended that the material which fills the crucible and the grid can be any one lead alloy adapted to be employed for the construction of electric batteries.

Figure 1:
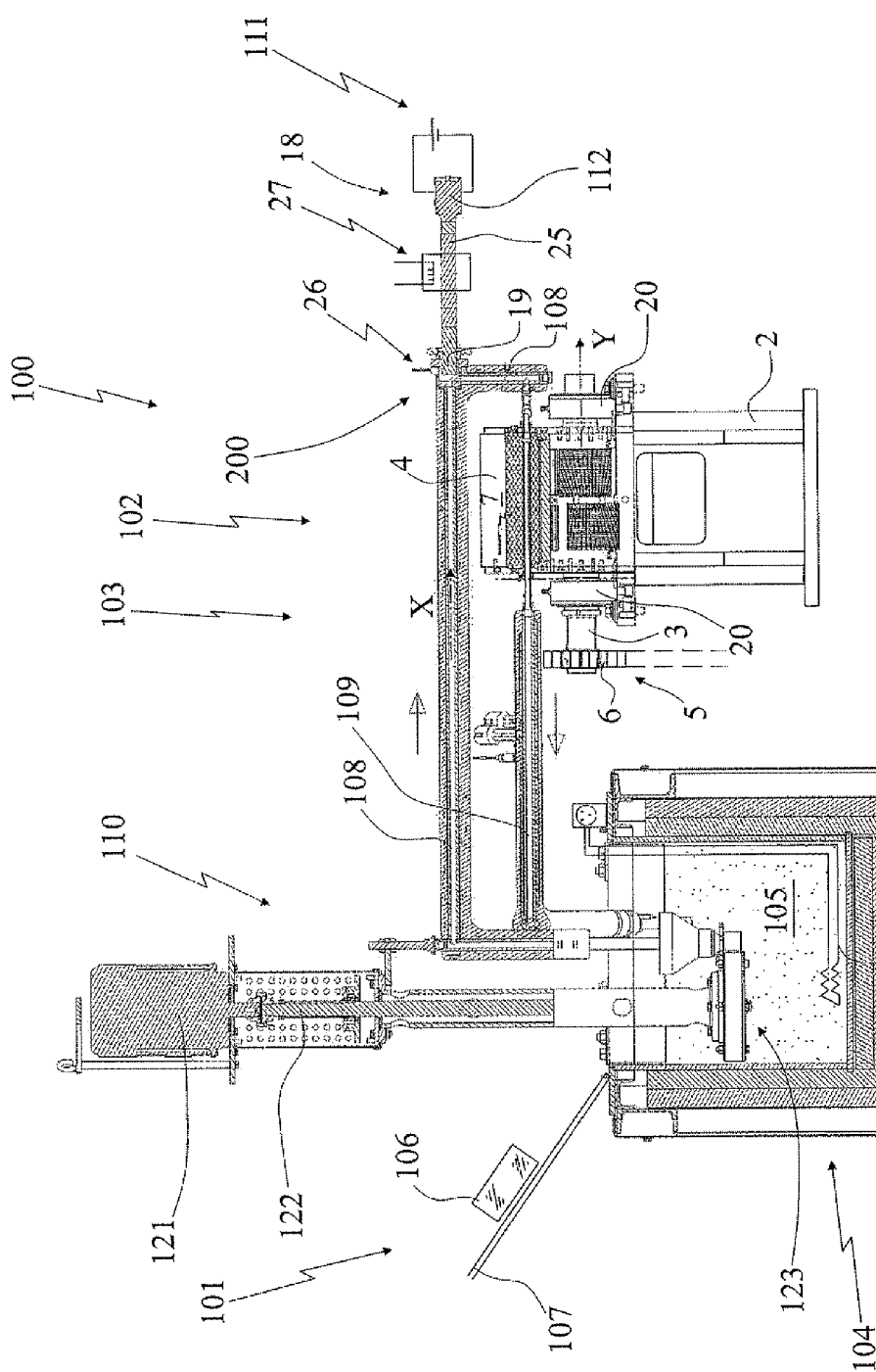
FIG. 1 shows a longitudinal section view of an embodiment of a plant for forming grids for electric battery plates, according to the present invention.

With particular reference to the enclosed figures, the plant consists of a molten lead source 101, of a grid forming machine 102 (of continuous casting type) and of feeding means 103 that hydraulically connect the molten lead source 101 and the grid forming machine 102 in a closed circuit for the continuous feeding of the molten lead illustrated in FIG. 1 with two arrows.

More in detail, the molten lead 101 source is provided with a crucible 104 containing molten lead 105, typically maintained at a melting temperature on the order of 500° C. The crucible 104 is fed with pig lead or lead ingots 106 by means of a transport line 107. The pig lead is melted in the crucible suitably provided with heating means, e.g. electric heating means 124.

Figure 2:
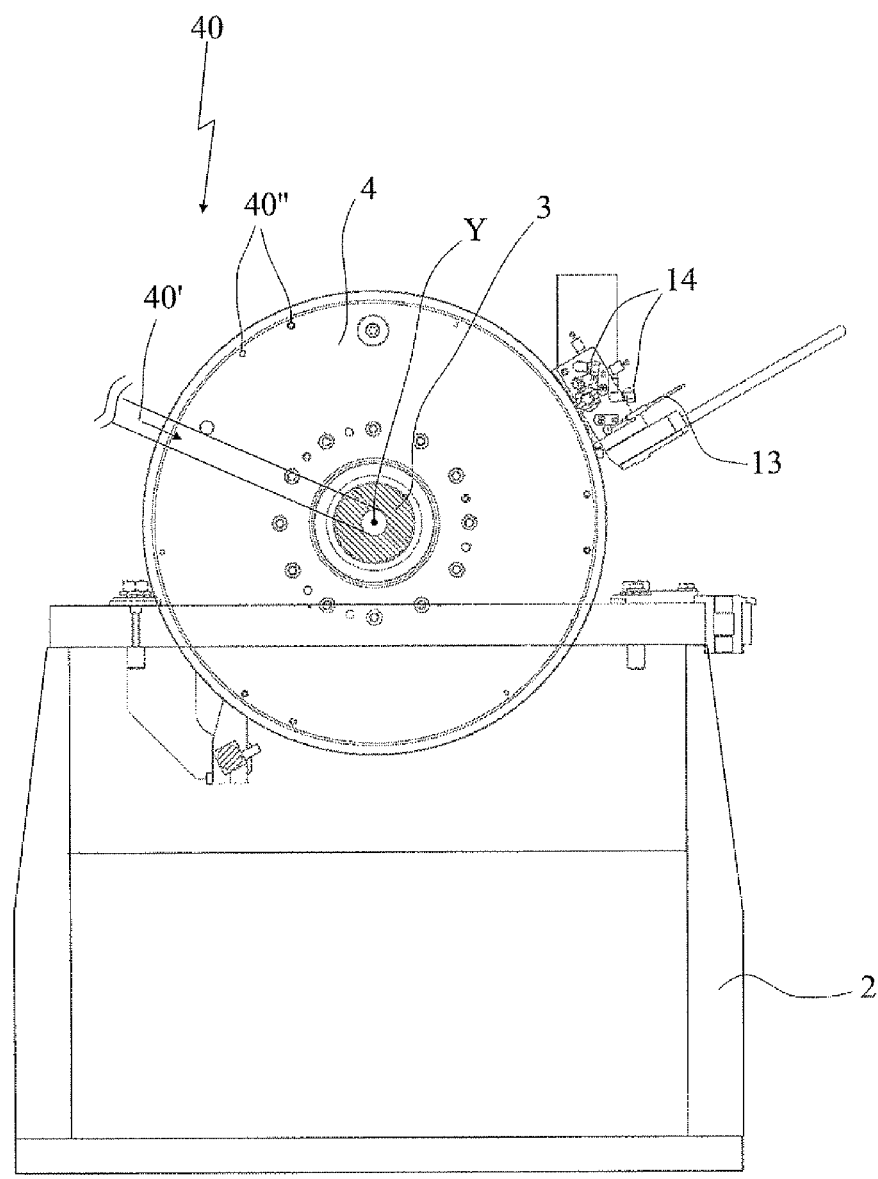
FIG. 2 shows a side view of a detail of the plant, according to the present invention, relative to a machine for forming grids by means of continuous casting of a lead alloy.

In turn, the grid forming machine 102 is provided, in a manner per se known to the man skilled in the art, with a support structure 2 set on the ground. On the support structure 2, by means of two support structures 20 with bearings, a shaft 3 is rotatably mounted bearing a rotary drum 4 fixed concentrically. The latter is actuated to rotate around the rotation axis Y thereof, arranged horizontally, by drive means 5 e.g. constituted by an engine with gear motor (not shown) that transmits its motion by means of a belt or chain (indicated with a dashed line in FIG. 2) to a gear wheel 6 fit on the shaft 3 of the rotary drum 4.

The rotary drum 4 is provided with an external peripheral surface 7 with a plurality of grooves 8, 9 obtained according to the design of the grid to be obtained. More in detail, the plurality of grooves comprises for example a first series of grooves 8, which are circumferentially extended on the external surface 7 of the rotary drum 4 and a second series of grooves 9, which are transversely extended with respect to the rotary drum 4 i.e. substantially parallel to the rotation axis Y. The first and the second grooves 8, 9 are adapted to obtain the lead filaments of the finished grid, respectively the longitudinal and transverse filaments. A groove is provided with an enlarged area 10 in order to form a conventional section for the welding contact of the grid.

The machine also comprises a sliding block 11 fixed to the support structure 2 by means of a frame 12. The sliding block 11 is constituted by a metallic body having a preferably smooth curved internal surface, with concave curvature corresponding to the convex curvature of the external surface 7 of the rotary drum 4 so to be adapted to be coupled thereto in a sliding relationship. For such purpose, several adjustment screws are provided for adjusting the seal pressure of the sliding block 11 against the rotary drum 7.

The sliding block 11 is maintained at a controlled temperature by means of heating means and cooling means, respectively indicated with 13 and 14.

Figure 3:
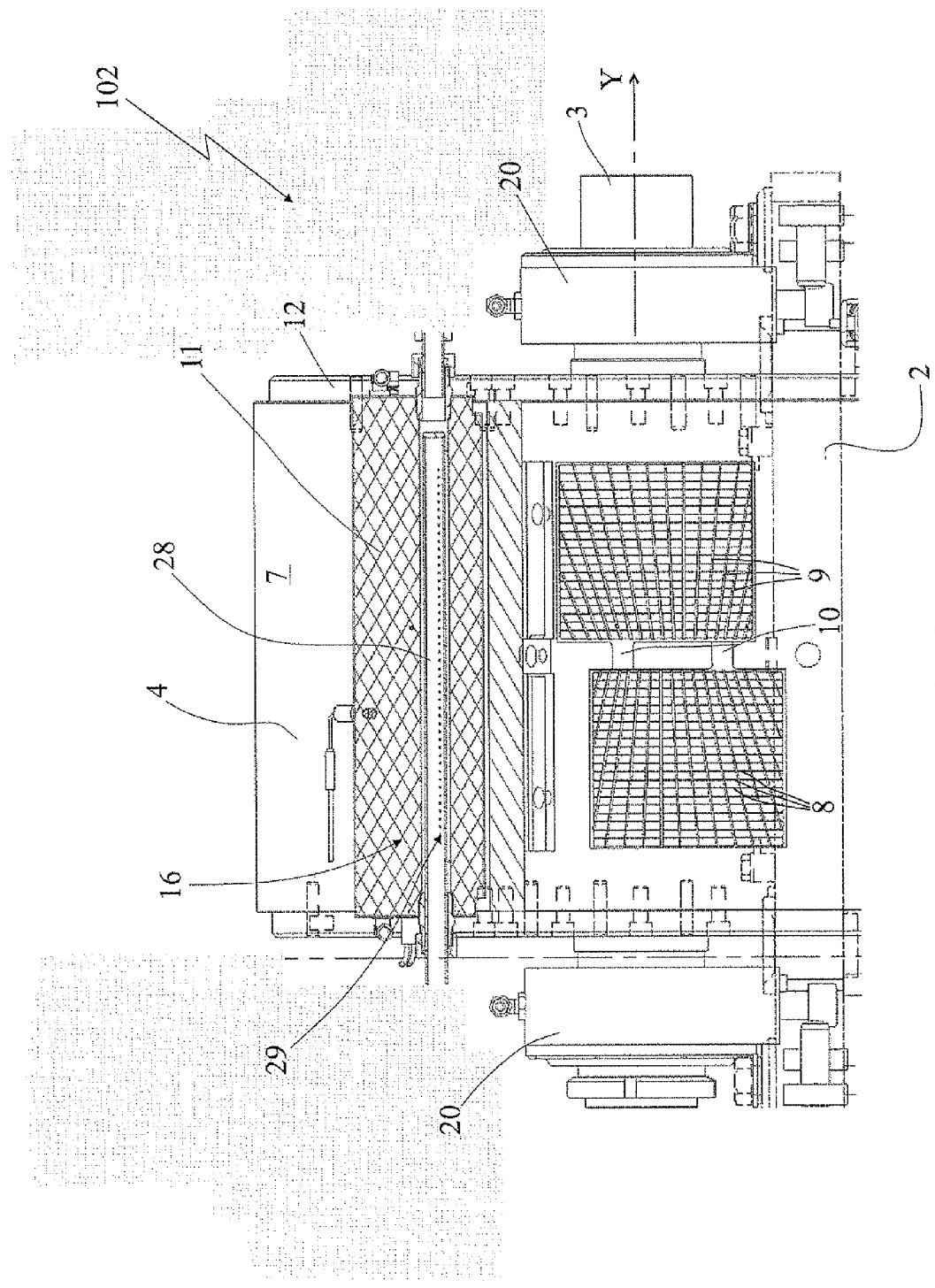
FIG. 3 shows an enlarged detail of the section of FIG. 2 relative to a sliding block for the distribution of the molten lead alloy on a rotary drum of the forming machine with continuous casting of the plant according to the invention.

More in detail, the heating means are constituted by heating elements 13 (of which only the electrical manifold is indicated in FIG. 3) in order to maintain the lead in the liquid state with the desired viscosity and allow an optimal distribution thereof in the grooves of the external surface 7 of the rotary drum 4. The cooling means 14 are constituted by a plurality of channels (of which only the hydraulic manifold for the inlet and outlet of the liquid is indicated in FIG. 3) for the passage of a cooling liquid.

The sliding block 11 bears, operatively and mechanically associated, as will be better specified below, means 16 for distributing the molten lead 105 connected to the means 103 for feeding the same molten lead 105 to be distributed.

The aforesaid feeding means 103 comprise a feed duct 108 and return duct 109 respectively connected to the crucible 104 of molten lead 105 and to the inlet and outlet of the distribution means 16 so as to form a closed circuit for a flow of molten lead 105. The feeding means 103 also comprise a pump 110 for forcing, under pressure and continuously, the molten lead contained in the crucible 105 to follow the circuit comprising the feed duct, the distribution means 16 and the return duct 109.

The pump 110 comprises a motor 121 connected to an impeller 123 by means of a shaft 122.

More in detail, the distribution means 16 for the molten lead 105 thus fed insert the molten lead within the grooves 8, 9 of the external peripheral surface 7 of the rotary drum 4, filling them in the passage in front of sliding block 11 during the rotation of the rotary drum 4 itself.

According to the idea underlying the present invention, an ultrasound generator 18 (sonotrode) is provided, placed to intercept the feed duct 108 and provided with at least one tip 19 immersed in the pressurized molten lead 105 flow that moves in a continuous manner in the feed duct 108 itself in order to transmit the waves produced by the ultrasound generator 18 thereto.

The introduction of vibrations induced by ultrasound in the molten lead 105 flow causes the onset of cavitation phenomena. The latter cause the formation of small cavitation bubbles with consequent formation of a high number of new solidification nuclei, around which the lead crystals will then be formed, and thus with a consequent high crystalline density of the final product (greater than the case without sonotrode or with sonotrode placed in a different position) and hence with high quality of the produced grid.

The ultrasound treatment therefore facilitates the increase of the number of nucleation points of the crystals and limits the formation of dendritic structures, facilitating the increase of crystalline density with consequent improvement of the mechanical and chemical characteristics of the finished grids.

The application of ultrasound is entirely compatible with the synergistic addition of refining agents, although this addition is now deemed to be superfluous.

Experimental tests have demonstrated that the arrangement of the ultrasound generator 18 leads to the formation of crystals, in the formed lead grids, with average size comprised between 15 and 60 micron whereas plants without ultrasound generator 18 or with ultrasound generation placed in the crucible or in other parts in contact with the molten lead have normally allowed obtaining crystals with size greater than 150 micron.

Advantageously, the tip 19 of the ultrasound generator 18 is placed in opposition to the advancing direction X of the molten lead 105 flow, which flows under pressure in the feed duct 108.

The pressurized lead flow frontally intercepts, in abutment, the tip 19 of the ultrasound generator 18, emitting the waves in the direction opposite the advancing direction X of the flow.

Due to this configuration, substantially all of the molten lead flow intercepts the tip 19 of the ultrasound generator 18 and there is thus an optimal distribution of the waves in the same molten lead 105 flow, with the result that the nuclei that are formed in contact with the tip are uniformly distributed inside the flow. It has also been found that the same configuration of the waves flowing against/in the opposite direction with respect to the pressurized flow also allows optimizing the efficiency of the ultrasound generator 18.

The aforesaid configuration is made possible in particular by an elbow-shaped progression 200 of the feed duct 108, formed by two sections 108' and 108" (in particular situated at 90° from each other), of which the first 108' is upstream, and the second 108" is downstream of the elbow 200, with the tip 19 of the ultrasound generator 18 frontally arranged with respect to the upstream section 108' of the feed duct 108.

Preferably, the upstream section 108' of the elbow 200 is horizontally arranged, so as to also place the axis of the ultrasound generator 18 horizontally, while the section 108" downstream of the elbow 200 is placed vertically.

Preferably, the sections 108' and 108", arranged upstream and downstream of the elbow 200, are hydraulically connected to each other by means of a connection manifold 230 at whose interior the tip 19 of the ultrasound generator 18 is housed.

Figure 4A:
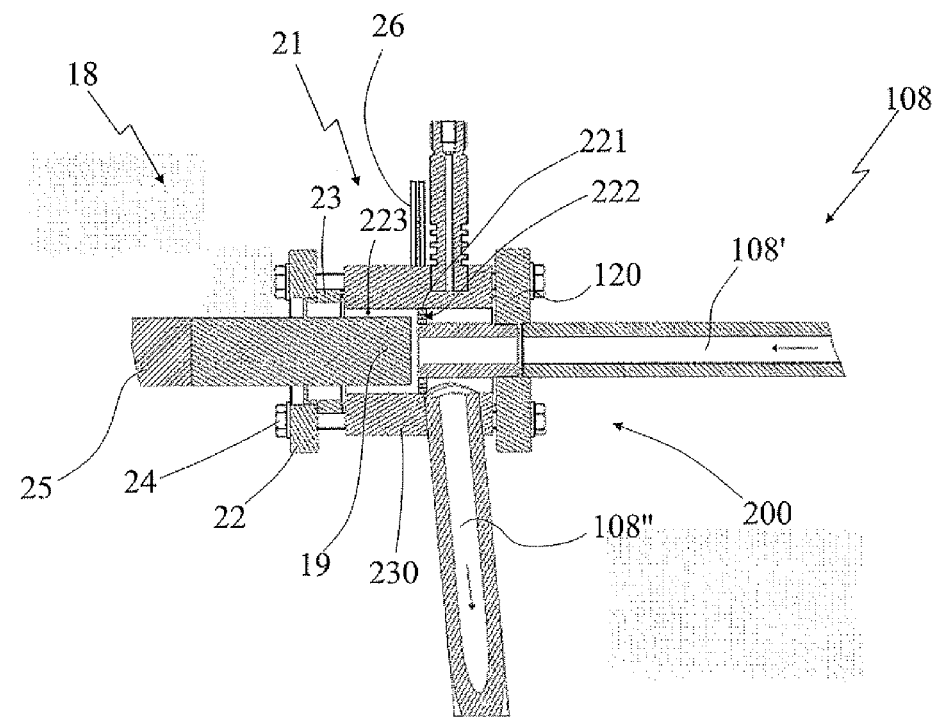
FIG. 4A & 4B show an enlarged detail of the plant of FIG. 1 relative to an ultrasound generator mounted on a duct for feeding the molten lead to the aforesaid forming machine in accordance with two different embodiments of the fixing joint.
Figure 4B:
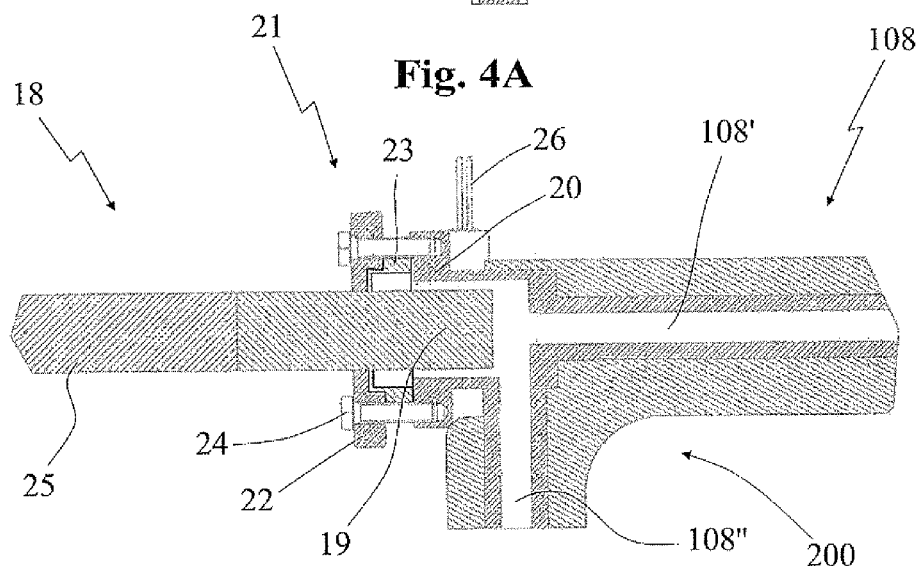

Preferably, the ultrasound generator 18 is fixed to the feed duct 108 by means of a fixing joint 21 preferably comprising a first flange 22 that acts on a ring 23 integral with the ultrasound generator 18 (and in particular with its tip 19) and is sealingly engaged in abutment against the connection manifold 230 with traction screws 24. The latter can be fixed at the top to the first section 108' of the feed duct 108 placed upstream of the elbow 200 as illustrated in FIG. 4B, or in accordance with the embodiment illustrated in FIG. 4A they can be sealingly engaged with a second flange 120 in turn drawn by the same screws 24 in abutment against the manifold 230.

Independent of the system for fixing the ultrasound generator 18 to the feed duct 108, a manifold 230 is present at a elbow 200 obtained by the feed duct 108. As is clearly illustrated in FIG. 4, the tip 19 of the ultrasound generator 18 is advantageously opposed to the arrival of the molten lead flow conveyed by the section of the feed duct 108' placed upstream of the elbow 200.

In order to prevent the molten lead flow from entering into the downstream section 108" of the elbow 200 of the feed duct 108 without having first hit the tip 19 of the ultrasound generator 18, a conveyor plate 221 is advantageously provided (only illustrated in the embodiment of FIG. 4A, even if it can of course also be provided in the embodiment of FIG. 413) inside the connection manifold 230, which forces the lead flow to pass in close contact with the tip of the ultrasound generator 18. For such purpose, the conveyor plate 221 is advantageously centrally traversed by the section of the feed duct 108' placed upstream of said elbow 200 and delimits, together with the connection manifold 230, a chamber 223, in which the tip 19 of the ultrasound generator 18 is housed. In order to allow the lead flow to exit from the manifold 230 once it has passed in front of ultrasound generator 18, the conveyor plate 221 is provided with openings 222, in particular arranged circumferentially, which connect the chamber 223 with the downstream section 108" of the feed duct 108. The plate is also peripherally sealed with the internal surface of the connection manifold 230 in order to force the lead flow that arrives through the central opening thereof to then pass through the openings 222.

Preferably, the fixing joint 21 is placed at a node of the waves emitted by the ultrasound generator 18 in order to ensure the seal in the coupling of the fixing joint 21.

More in detail, the ultrasound generator 18 comprises an elongated rod, in particular made of metal and a power generator 111 adapted to produce pulses of electric current that are transmitted to a piezoelectric transducer 112 which converts them into mechanical vibrations with ultrasonic frequency, which are in turn transmitted to the elongated rod and distributed in the molten lead by means of the vibrating tip 19.

The tip 19 is constituted by a material capable of resisting the temperature of the molten lead and corrosion phenomena (e.g. titanium). The acoustic waves will preferably have a frequency greater than 15 KHz. Advantageously, the above-mentioned tip 19 is fixed at the rear part to an elongated body 25, e.g. made of aluminum.

Advantageously, in order to prevent the molten lead 105 from solidifying upon contact with the tip 19 of the ultrasound generator 18, heating means 26 are provided (e.g. obtained with heating elements; in the figures, only the electrical connection thereof is illustrated) associated with the duct at the tip 19 of the ultrasound generator 18.

Advantageously, second cooling means 27 are also provided, associated with the elongated body 25 of the ultrasound generator 18 in order to prevent the heat from being transmitted to the power generator, which would ruin it.

The distribution means 16 preferably comprise a distribution duct 28 provided in the sliding block 11 parallel to the rotation axis Y and over the entire transverse extension of the grooves 8, 9. Such duct 28 is hydraulically connected with the surface of the drum 4 in order to insert the molten lead in the grooves 8, 9 by means of a succession of openings 29 or by means of a single elongated slit. In each case, the molten lead is conveyed within the grooves 8, 9 in a uniform manner by means of a plurality of openings 29 or by means of an elongated slit, which is extended parallel along the sliding block 11 for the entire width of the grooves on the external surface 7 of the rotary drum 4.

The distribution duct 28 for molten lead is preferably fed in overpressure in order to discharge the molten lead in the plurality of openings 29 or in the elongated slit (not illustrated) and from this to the grooves 8, 9 of the rotary drum 4, filling them quickly and fully.

The rotary drum 4 is cooled by means of the cooling means 40, per se known to a man skilled in the art and for this reason not described in detail. Such cooling means 40 can for example comprise a circuit for the circulation of a cooling fluid advantageously constituted by water, which by means of the use of pumping means is sent to the internal chamber enclosed by the rotary drum 4 and drawn from the latter in order to attain a closed circuit. Preferably, such circuit provides for sending the fluid into the drum 7 and drawing it from the drum by means of central ducts 40' connected to the two ends of the shaft 3 which for such purpose is suitably hollow. A plurality of peripheral longitudinal pipes are provided, placed at the surface to be cooled of the drum 4 and in connection with the central ducts (indicated with 40' in FIG. 2).

The first and the second cooling means 14 and 27 can form a single water cooling circuit capable of cooling both the drum 4 and the elongated body 25 of the ultrasound generator 18.

The continuous grid strip that is continually formed during the rotation of the rotary drum 4 following the cooling of the lead in the grooves 8, 9 of the external surface 7 of the rotary drum 4 is then drawn for example after an arc of circumference of about 20° with respect to the position of the sliding block 11 and sent to the subsequent processing steps, such as rolling and cutting.

The finding thus conceived therefore attains the preset objects. Of course, in the practical achievement thereof, it can also assume forms and configurations different from that illustrated above, without departing from the present protective scope.

In addition, all details can be substituted with technically equivalent elements and the size, shapes, and materials used can be of any type as required.

The invention claimed is:

1. Plant for forming grids for electric battery plates, which comprises:
   a crucible (104) containing molten lead (105);
   a grid forming machine (102) provided:
   with a support structure (2) set on the ground;
   with a rotary drum (4) rotatably mounted on said support structure (2) around a rotation axis (Y), around which it is actuated to rotate by drive means, said rotary drum (4) being provided with an external peripheral surface (7) with a plurality of grooves (8, 9) obtained in accordance with a grid design to be attained;
   with a sliding block (11), mounted fixed on said support structure (2), slidably sealingly coupled with the external surface (7) of said rotary drum (4), and provided with means (16) for distributing molten lead (105), adapted to insert said molten lead (105) within the grooves (8, 9) of said external peripheral surface (7), filling them during the rotation of said rotary drum (4);
   means for feeding molten lead (103) in order to feed said forming machine (102) in a continuous manner with a flow of molten lead (105) drawn from said crucible (104), comprising:
   a feed duct (108), which is connected to said crucible (104) of molten lead (105) and to an inlet of said distribution means (16);
   a return duct (109) connected to an outlet of said distribution means (16) and to said crucible (104);
   a pump (110) for forcing the circulation of the flow of molten lead (105) under pressure between said crucible (104) and said distribution means
   (16) by means of said feed duct (108) and said return duct (109);
wherein an ultrasound generator (18) is placed to intercept the feed duct (108) and is provided with at least one tip (19) immersed in the pressurized flow of molten lead (105) that moves through said feed duct (108) in order to transmit the waves produced by the ultrasound generator (18) to said molten lead (105).

2. Plant according to claim 1, characterized in that the tip (19) of said ultrasound generator (18) is placed to oppose an advancing direction (X) of the flow of molten lead (105) in said feed duet (108).

3. Plant according to claim 1, characterized in that said distribution means (16) comprise a distribution duct (28), which is extended in said sliding block (11) for the entire transverse extension of said grooves (8, 9) with which it communicates by means of a succession of openings (29) or by means of an elongated slit.

4. Plant according to claim 1, characterized in that said ultrasound generator (18) comprises a power generator (111) adapted to produce pulses of electric current which are transmitted to a piezoelectric transducer (112) which in turn converts the waves into mechanical vibrations with ultrasonic frequency distributed in the flow of molten lead (105) by means of said tip (19).

5. Plant according to claim 4, characterized in that it comprises second cooling means (27) associated with an elongated body (25) of said ultrasound generator (18) in order to prevent the heat from being transmitted to the power generator (111).

6. Plant according to claim 1, characterized in that said ultrasound generator (18) is fixed on said feed duct (108) by means of a fixing joint (21) at a node of the waves emitted by said ultrasound generator (18).

7. Plant according to claim 1, characterized in that it comprises heating means (26) associated with the feed duct (108) at the tip (19) of said ultrasound generator (18).

8. Plant according to claim 1, characterized in that said feed duct (108) has an elbow-shaped progression (200) and comprises two sections (108', 108"), of which the first (108') is upstream, and the second (108") is downstream of said elbow (200), with the tip (19) of said ultrasound generator (18) arranged frontally with respect to the upstream section (108') of said feed duct (108).

9. Plant according to claim 8, characterized in that said upstream and downstream sections (108', 108") of said elbow (200) are hydraulically connected to each other by means of a connection manifold (230) at whose interior the tip (19) of said ultrasound generator (18) is housed, such tip (19) placed in opposition to the lead flow conveyed against it by the section of the feed duct (108') placed upstream of said elbow (200).

10. Plant according to claim 9, characterized in that it comprises a conveyor plate (221) placed inside said connection manifold (230), which forces the lead flow to pass in close contact with the tip of said ultrasound generator (18).

11. Plant according to claim 10, characterized in that said conveyor plate (221) is centrally traversed by the section of the feed duct (108') placed upstream of said elbow (200), and delimits, together with said connection manifold (230), a chamber (223) in which the tip (19) of said ultrasound generator (18) is housed, such chamber (223) provided with openings (222) that connect said chamber (223) with the downstream section (108") of the feed duct (108) in order to allow the lead flow to exit from said manifold (230) once it has passed in front of the ultrasound generator (18).

12. Plant according to claim 8, characterized in that said ultrasound generator (18) is fixed on said feed duct (108) by means of a fixing joint (21), which comprises a first flange (22) which is thrust against a ring (23) integral with the ultrasound generator (18) by means of traction screws (24).

* * * * *